United States Patent [19]

Yamashita et al.

[11] 4,306,762

[45] Dec. 22, 1981

[54] REFLECTING APPARATUS IN AN OPTICAL SYSTEM

[75] Inventors: Yoshimi Yamashita, Omiya; Tatsuyo Takanashi, Kamakura, both of Japan

[73] Assignee: Tokina Optical Co., Ltd., Tokyo, Japan

[21] Appl. No.: 131,818

[22] Filed: Mar. 19, 1980

[30] Foreign Application Priority Data

Apr. 26, 1979 [JP] Japan .................................. 54-50873

[51] Int. Cl.³ .............................................. G02B 5/26
[52] U.S. Cl. ...................................... 350/1.6; 350/290
[58] Field of Search ................... 355/66, 71; 350/446, 350/104, 105, 290

[56] References Cited

U.S. PATENT DOCUMENTS 3,645,600  2/1972  Doctoroff et al. ............. 350/290 X
4,132,477  1/1979  Watabe et al. ........................ 356/66

Primary Examiner—John K. Corbin
Assistant Examiner—Bruce Y. Arnold
Attorney, Agent, or Firm—Watson, Cole, Grindle & Watson

[57] ABSTRACT

A reflecting apparatus in an optical system in which, in order to transmit image light effectively to a light receiving body having a given spectral sensitivity characteristic, either a single or plural reflecting film layer, having a spectral sensitivity characteristic approximately equal to that of the light receiving body, is formed on a polished surface which forms one face of a light absorbing substance.

4 Claims, 4 Drawing Figures

REFLECTING APPARATUS IN AN OPTICAL SYSTEM

BACKGROUND OF THE INVENTION

In order to transmit and radiate image light to a light receiving body having a spectral waveform characteristic, such as a photographic photosensitive material, it is well known to use an optical system provided with a reflecting apparatus for reflecting image light from an object. In such an optical system, even if light of a wavelength to which a light receiving body is slightly sensitive is radiated and transmitted to the light receiving body, the latter does not become sensitized at all. Therefore, the reflection and transmission of light of such a wavelength is meaningless in sensitizing the light receiving body. Moreover, such light acts as interfering light, so it should be absorbed.

To avoid the aforementioned problem, there has heretofore been used a reflecting apparatus for an optical system in which a colored glass filter is provided, whereby only image rays having a spectral sensitivity characteristic approximate to that of the light receiving body are selectively reflected.

Generally speaking, however, a colored filter has a property such that light rays having a spectral wavelength characteristic approximately equal to that for selective reflection are transmitted, and light having other spectral wavelength characteristics are absorbed. In the course of selecting a spectral reflection characteristic, therefore, the loss in the quantity of light is large and a portion of the transmitted light causes what is known as a flare phenomenon. It is therefore necessary to eliminate such transmitted light.

It has also been proposed, for example in U.S. Pat. No. 4,132,477, to substitute for the aforementioned colored filter a dichroic mirror or interference film layer or layers formed on a transparent base substrate from substances having different refractive indices. In such a film layer or layers, however, since the spectral wavelength characteristic of light to be selectively reflected and that of light to be selectively transmitted are complementary, the quantity of selectively reflected light is large. Moreover, if the spectral characteristic of the film layer is well matched to that of the light receiving body, the flare phenomenon caused by selectively transmitted light is eliminated, but it is difficult to precisely match the two spectral characteristics, so the transmitted light acts as an interfering light unless it is cut off completely.

To solve this problem, in the above-cited U.S. Pat. No. 4,132,477 and as illustrated in FIGS. 8 and 9 thereof, a transparent glass or plastic body is used as a substrate, and having a face confronting a converging lens, on which is formed a dichroic mirror. The back of the substrate is processed so as to be light-diffusing. Furthermore, a light absorbing plate is provided on the extension of the optical axis behind the substrate. The casing for these components is tightly shielded at the back thereof. These fabrication requirements are troublesome, leading to increased cost.

SUMMARY OF THE INVENTION

This invention relates to a reflecting apparatus in an optical system for transmitting light from an original to an object to be exposed to light, in which an absorbing body, adapted to completely absorb at least light of wavelengths to which the object to be exposed to light is sensitive and to absorb visible rays, is used as a substrate. The face of the absorbing body confronting the light incident side is ground, and on that ground surface is formed a reflecting film layer or layers adapted to selectively reflect light of a predetermined wavelength region nearly matching the spectral wavelength sensitivity characteristic of the object to be exposed to light.

It is an object of this invention to provide a reflecting apparatus in an optical system for efficiently transmitting light from an original to an object to be exposed to light.

It is another object of this invention to provide a reflecting apparatus in an optical system in which light from an original is selectively reflected by a reflecting film layer or layers; the reflecting film layer (or layers) being adapted to selectively reflect light having a spectral characteristic almost matching the spectral sensitivity characteristic of an object to be exposed to light; and selectively transmitted light is prevented from acting as interfering light.

It is a further object of this invention to provide a reflecting apparatus in an optical system in which a reflecting film layer or layers, adapted to selectively reflect light from an original having a spectral characteristic almost matching the spectral sensitivity characteristic of an object to be exposed to light, is formed on a ground surface on a light incident side of a substrate which is capable of absorbing light from the original.

It is still a further object of this invention to provide a reflecting apparatus in an optical system which is of simple construction and low cost.

BRIEF DESCRIPTION OF THE DRAWINGS

The above objects, features and advantages will be readily apparent from the following description taken in conjunction with the accompanying drawings.

DESCRIPTION OF THE PREFERRED EMBODIMENT

For example, in an optical system for copying equipment having an optical path for transmitting light from an original to an object to be exposed to light, such as a photosensitive film, there is known a reflecting apparatus having a construction such that, in order to effectively reflect light in the optical path, the face on a light incident side of a transparent substrate is polished and on that polished face is formed a reflecting film layer or layers adapted to selectively reflect light in a predetermined wavelength region almost matching the spectral wavelength sensitivity characteristic of the object to be exposed to light. A converging lens is disposed on the light incident side of the reflecting member, and these components are housed in a casing.

Figure 1:
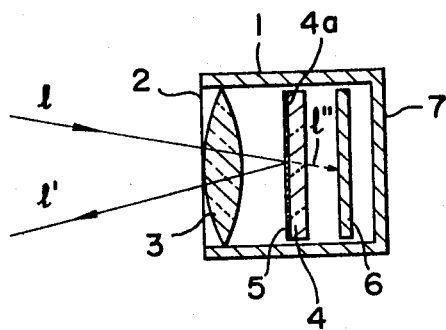
FIG. 1 is a simplifed schematic sectional view of a reflecting apparatus in a prior art optical system.

An example of such a construction is shown in FIG. 1, in which opening 2 is formed at one axial end of opaque, tubular casing 1. Within casing 1 are disposed converging lens 3 facing opening 2, and transparent body 4 is a substrate formed of glass, plastic or the like, the face of which confronts converging lens 3 and is polished to form polished face 4a, which is covered with reflecting film layer or layers 5 adapted to selectively reflect light of a predetermined wavelength region almost matching the spectral wavelength sensitivity characteristic of an object (not shown) to be exposed to light. Light 1 from an original (not shown) passes through converging lens 3, is selectively reflected by reflecting film layer 5, then again passes through converging lens 3 and is directed as reflected light 1' to the object to be exposed to light.

However, light rays of a wavelength region not selectively reflected and contained in incident light 1 pass through substrate 4 as transmitted light 1". If transmitted light 1" is radiated outside casing 1, its wavelength characteristic, though containing less a component of the spectral sensitivity characteristic of the object to be exposed to light, may cause flare in the image or, act as various interfering rays in a copying operation. To avoid such a problem it is necessary to dispose light absorbing body 6 behind substrate 4 to absorb at least all of the wavelengths in transmitted light 1", to which the object to be exposed to light has a sensitivity, as well as to absorb light rays in the visible region. Bottom plate 7 is also disposed at the end opposite to the one end defining opening 2 to prevent extraneous light from entering casing 1. These arrangements represent a complicated construction of the reflecting apparatus and result in increased cost.

Figure 2:
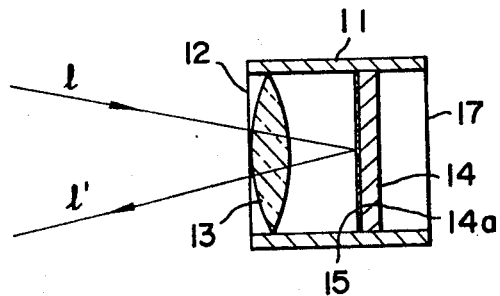
FIG. 2 is a sectional view of a reflecting apparatus in an optical system according to this invention.

To eliminate such drawbacks associated with the prior art apparatus, in this invention as illustrated in FIG. 2, base substrate 14 for a reflecting member located behind converging lens 2 is formed of an absorbing body which is adapted to completely absorb light of wavelengths to which the object to be exposed to light has a spectral sensitivity, and also to absorb most light rays of the visible region. Tubular casing 11, formed of an opaque substance, is provided with openings 12 and 17 at both axial ends thereof, and converging lens 13 is disposed within casing 13 in close proximity to one opening 12. Further disposed behind converging lens 13 is substrate 14 consisting of a light absorbing substance adapted to completely absorb at least light having the spectral sensitivity characteristic of an object to be exposed to light, and also to absorb most of the light in the visible ray wavelength region. On the face of light absorbing substrate 14 confronting converging lens 13 is formed polished face 14a for the regular reflection of light. As illustrated, substrate 14 is plate-like, but a prismatic one may also be used; also, polished surface 14a is not always required to be planar, it may be a concave surface having a large radius of curvature, or it may even be a convex surface. Polished face 14a is covered with a reflecting film layer or layers, consisting of a substance which has a spectral reflecting characteristic almost matching that of an object to be exposed to light. Reflecting film layer 15 consists of, as is well known, a substance having a high refractive index, such as $CeO_2$, and a substance having a low refractive index, such as $MgF_2$, which are deposited alternately in layers at $\frac{1}{4}$ or $\frac{1}{2}$ or $\frac{3}{4}$ in thickness of the wavelength of light by vacuum evaporation or spattering.

Figure 3:
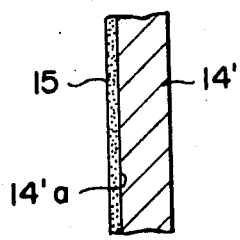
FIGS. 3 and 4 are enlarged sectional views of reflecting members embodying the invention, the embodiment of FIG. 3 using ceramics or a metallic member such as aluminum as a substrate of the reflecting member, and the embodiment of FIG. 4 using an opaque filter of a color close to black as a substrate of the reflecting member.
Figure 4:
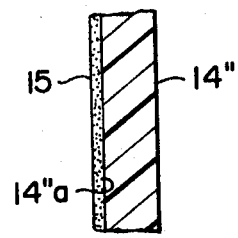

Referring more fully to the substrate 14, as previously noted, it should be formed of a light absorbing material, and should be capable of being polished at one face thereof so as to form a regular reflection surface. It is exemplified in FIG. 3, in which a ceramic or aluminum plate 14' of a color close to black is used, and is also exemplified in FIG. 4 in which an opaque filter plate 14" of a color close to black is used.

In the reflecting apparatus shown in FIG. 2, if light 1 from an original is incident (as shown by the arrow), it passes through converging lens 13 and strikes against the reflecting member, such that reflecting film layer 15 reflects only light rays of predetermined wavelengths almost matching the spectral sensitivity characteristic of the object to be exposed to light. The reflected light again passes through converging lens 13 and goes towards the object to be exposed to light as radiated light 1'. However, the light rays which have passed through reflecting film layer 15 are absorbed immediately by light absorbing base substrate 14; therefore, it is not necessary to separately provide light absorbing plate 6 and bottom plate 7 of the casing as shown in FIG. 1. This also allows the other end of casing 11 to be left open as is opening 17.

Consequently, in the reflecting apparatus in an optical system according to this invention, light from an original can be transmitted effectively and efficiently to an object to be exposed to light. Moreover, it is not necessary to separately provide an absorbing plate or a bottom plate in casing 11. Thus, the construction can be made simple and low in cost. Furthermore, the incident light which has passed through the reflecting film layer or layers never acts as an interfering light to produce a flaring effect, not does it act as an interfering light during a copying operation.

This invention is also applicable to cameras and enlargers, as well as the foregoing copying machine application as specifically set forth herein.

What is claimed is:

1. A reflecting apparatus in an optical system for transmitting light from an original to an object to be exposed to light, comprising:
    a casing for eliminating extraneous light;
    a converging lens disposed in an opened portion formed at one end of said casing;
    a substrate made of a light-absorbing substance and disposed within said casing behind said converging lens and having a face confronting said converging lens, said face being polished for specular reflection;
    at least one reflecting film layer formed on said polished face and adapted to reflect light of a desired wavelength almost matching the spectral sensitivity characteristic of the object to be exposed to light; and
    said substrate is adapted to substantially completely absorb at least light having passed through said at least one reflecting film layer and also to absorb most of the light rays in the visible wavelength region.

2. The reflecting apparatus as defined in claim 1, wherein said substrate consists of a ceramic material having a nearly black color.

3. The reflecting apparatus as defined in claim 1, wherein said substrate consists of an opaque filter having a nearly black color.

4. The reflecting apparatus as defined in claim 1, wherein said substrate consists of a metal having a nearly black color.

* * * * *